(12) United States Patent
Yates et al.

(10) Patent No.: US 9,051,770 B2
(45) Date of Patent: Jun. 9, 2015

(54) ADJUSTABLE WIDTH BARRIER

(71) Applicant: MUNCHKIN, INC., Van Nuys, CA (US)

(72) Inventors: Adam John Yates, Newcastle Upon Tyne (GB); Steven Bryan Dunn, Beverly Hills, CA (US); Mark A. Hatherill, Beverly Hills, CA (US); Rodolfo Gastelum, San Pedro, CA (US); Thomas Birkert, West Hills, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 14/038,670

(22) Filed: Sep. 26, 2013

(65) Prior Publication Data
US 2014/0150349 A1 Jun. 5, 2014

Related U.S. Application Data

(63) Continuation of application No. 12/967,140, filed on Dec. 14, 2010, now Pat. No. 8,578,656.

(51) Int. Cl.
E06B 9/06 (2006.01)
E06B 11/02 (2006.01)
E06B 3/70 (2006.01)

(52) U.S. Cl.
CPC .............. E06B 9/06 (2013.01); E06B 9/0653 (2013.01); E06B 11/02 (2013.01); E06B 2003/7096 (2013.01)

(58) Field of Classification Search
CPC .......... E06B 9/06; E06B 9/0653; E06B 11/02
USPC .......... 49/50, 55, 57, 465, 463; 160/216, 215, 160/225; 292/23, 193, 239, 289, 295, 300, 292/302, DIG. 29
See application file for complete search history.

(56) References Cited

U.S. PATENT DOCUMENTS 398,861 A 3/1889 Stewart
942,502 A 12/1909 Jablonovsky
(Continued)

FOREIGN PATENT DOCUMENTS

| GB | 893687 | 4/1962 |
| WO | 94/00664 | 1/1994 |
| WO | 99/09285 | 2/1999 |

OTHER PUBLICATIONS

International Search Report and Written Opinion for PCT/US2011/064926 issued Apr. 17, 2012 (16 pages).
(Continued)

Primary Examiner — Katherine Mitchell
Assistant Examiner — Scott Denion
(74) Attorney, Agent, or Firm — Wade C. Yamazaki; Robert Z. Evora

(57) ABSTRACT

A barrier has an expandable width barrier having opposing first and second ends. A locking arm is pivotably coupled to the expandable width barrier at the first end and slidably coupled to the expandable width barrier at the second end. The locking arm may be an adjustable-length construction. The pivoting of the locking arm causes the barrier to move between locked and unlocked states. When the locking arm is pivoted to lock the barrier, it causes the barrier to linearly expand a supplemental amount and fits the barrier to opposing sides of a passageway opening.

20 Claims, 17 Drawing Sheets

(56) References Cited

U.S. PATENT DOCUMENTS

| | | | |
|---|---|---|---|
| 1,078,874 A | 11/1913 | Potter | |
| 1,169,696 A | 1/1916 | Thorp | |
| 1,212,753 A | 1/1917 | Fisher | |
| 1,450,117 A * | 3/1923 | Rush | 160/136 |
| 1,545,278 A | 7/1925 | Rachlin | |
| 1,683,204 A | 9/1928 | Mills | |
| 1,981,319 A | 11/1934 | Jones | |
| 2,559,066 A | 10/1949 | Diefenbronn | |
| 2,814,340 A | 11/1957 | Porter | |
| 3,216,482 A | 11/1965 | Lindholm | |
| 3,260,303 A | 7/1966 | Pipe | |
| 3,431,966 A | 3/1969 | Injeski | |
| 3,754,783 A | 8/1973 | Childers | |
| 4,116,135 A | 9/1978 | Jaekle et al. | |
| 4,167,155 A | 9/1979 | Wade et al. | |
| 4,314,721 A | 2/1982 | Clark | |
| 4,330,958 A | 5/1982 | Richmond | |
| 4,437,694 A | 3/1984 | Lillo | |
| 4,607,455 A | 8/1986 | Bluem et al. | |
| 4,796,385 A | 1/1989 | Tyler | |
| 4,884,614 A | 12/1989 | Spurling | |
| 5,052,461 A | 10/1991 | Stern | |
| 5,081,723 A | 1/1992 | Saunders | |
| 5,117,585 A | 6/1992 | Andrisin, III | |
| 5,361,848 A | 11/1994 | Fleischer et al. | |
| 5,533,561 A | 7/1996 | Forehand, IV | |
| 5,535,552 A | 7/1996 | Stern | |
| 5,549,499 A | 8/1996 | Foskey et al. | |
| 5,690,317 A | 11/1997 | Sandsborg | |
| 5,771,505 A * | 6/1998 | Reynolds | 4/559 |
| 5,782,039 A * | 7/1998 | Scherer et al. | 49/465 |
| 5,829,505 A | 11/1998 | Brescia | |
| 5,865,485 A * | 2/1999 | Lawhorne, Jr. | 292/289 |
| 5,906,068 A | 5/1999 | Bode | |
| 5,924,242 A | 7/1999 | Macari et al. | |
| 6,233,874 B1 * | 5/2001 | Johnson, Jr. | 49/465 |
| 6,449,901 B1 | 9/2002 | Gibree et al. | |
| 6,536,502 B2 | 3/2003 | Britto et al. | |
| 6,640,509 B2 | 11/2003 | Clewis | |
| 7,178,792 B2 | 2/2007 | Monahan et al. | |
| 7,305,800 B1 | 12/2007 | Calfee | |
| 7,422,048 B2 * | 9/2008 | Andersen | 160/377 |
| 8,261,490 B2 | 9/2012 | Flannery et al. | |
| 2007/0017156 A1 | 1/2007 | Robinson et al. | |
| 2007/0245631 A1 | 10/2007 | Yi | |
| 2009/0260293 A1 | 10/2009 | Lough | |
| 2010/0083577 A1 | 4/2010 | Flannery et al. | |
| 2010/0115843 A1 | 5/2010 | Gallenschuetz | |
| 2012/0144745 A1 | 6/2012 | Yates et al. | |

OTHER PUBLICATIONS

Amazon.com; Evenflo Position and Lock Wood Safety Sep. 26, 2013; http://www.amazon.com/dp/B000056JHl/?tag=picc-20 (6 pages).

The Pivot arm and gate "L" bracket—Installation Manual Sep. 26, 2013 http://www.dickey-john.com/_media/pw_acc_GateHeightSensor_installation.pdf (10 pages).

The ladder Safety Gate—Installation Instructions and Technical Data; Kee Industrial Products, Inc.; Apr. 2007 http://simplifiedsafety.com/downloads/SafetyGate_Apr_2007.pdf (3 pages).

* cited by examiner

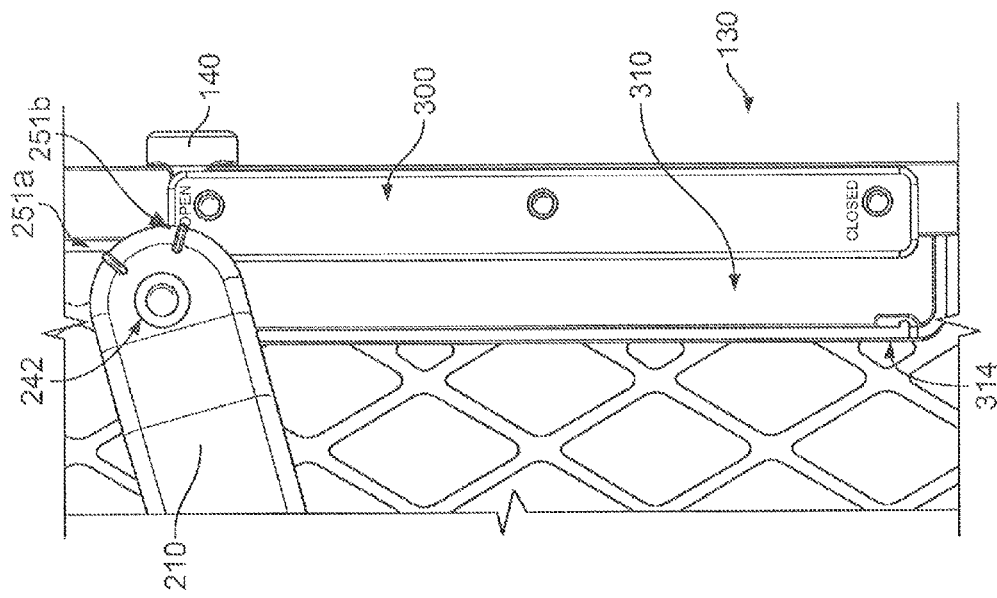
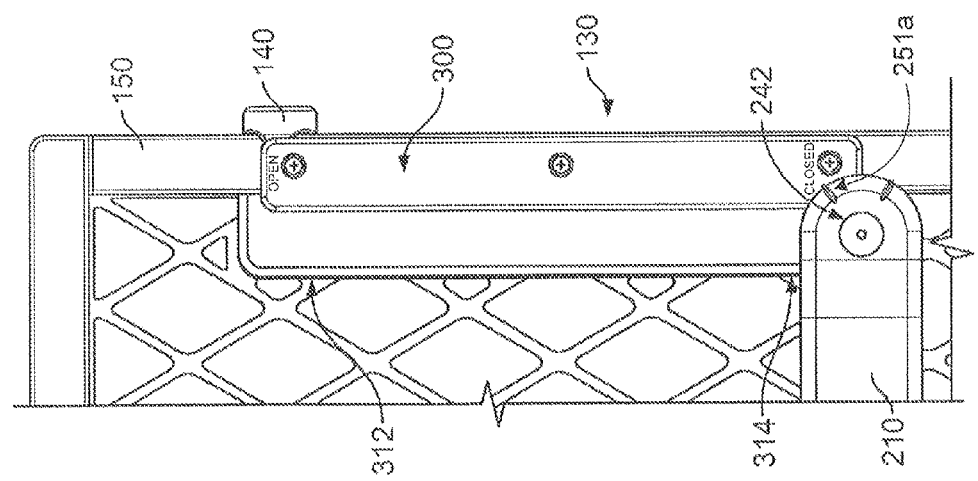

ADJUSTABLE WIDTH BARRIER

CROSS REFERENCE TO RELATED APPLICATION

This application claims priority to U.S. patent application Ser. No. 12/967,140, filed Dec. 14, 2010; the contents of which are hereby incorporated by reference herein in their entirety into this disclosure.

FIELD

The present invention generally relates to barrier devices, and in particular to an adjustable width gate.

BACKGROUND

Falls are a leading cause of injuries for children and toddlers in the home. Safety gates can be used around the home to prevent children from entry into a staircase region or keep the children in a safe area in the home where they can be watched by a caregiver. Additionally, safety gates can be used to prevent movement of small household pets into unwanted spaces or rooms.

BRIEF SUMMARY

Aspects of the present invention pertain to a barrier, such as an adjustable width gate.

According to one aspect, there is provided a gate including an expandable barrier and a locking member having a first end pivotally attached to the expandable barrier at a first location and a second end slidably coupled to the expandable barrier at a second location. The second end is rotatable about the first location so as to extend the expandable barrier for horizontal movement thereby providing a pressure fit engagement against a surface.

According to another aspect, a gate includes a first panel and a second panel coupled together for relative linear slidable motion. An adjustable-length locking member has a first end pivotally coupled to the first panel and a second end slidably coupled to the second panel. The gate is movable between a retracted position with the adjustable-length locking member having a first length and an expanded position with the adjustable-length locking member having a second length greater than the first length. The gate is movable between locked and unlocked states in the extended position responsive to pivoting of the adjustable-length locking member about its first end. The pivoting of the adjustable-length locking member causes the first and second panels to slidably move relative to each other.

According to one aspect, there is provided a gate including a first panel and a second panel coupled together for relative linear slidable motion. An adjustable-length locking member has a first end pivotally coupled to the first panel and a second end slidably coupled to the second panel. The adjustable-length locking member includes first and second members. The second member includes a biased stop member configured to engage the first member at a plurality of incrementally spaced fixed positions along the length of the first member and the first member includes a series of linearly spaced ridges and grooves engagable with the stop member.

According to one aspect, there is provided a gate having an expandable barrier including a pivot end and a distal end. The pivot end is laterally disposed from the distal end; and a locking member is disposed at the pivot end and extended to the distal end. The distal end is configured for linear movement and rotatable movement about the pivot end so as to extend the barrier for linear movement.

According to another aspect, the locking member further includes a first member slidably coupled to a second member where the second member is linearly movable with respect to the first member.

According to another aspect, the second member of the locking member includes a biased pivotable member configured to incrementally engage the first member along a portion of a length of the first member.

According to another aspect, the first member includes a linear series of ridges and grooves engagable with the second member. According to yet another aspect, the second member includes a spring biased pivotable member configured to engage the ridges and grooves of the first member.

According to another aspect, the distal end of the locking member may include a slidable member mounted thereon for locking and unlocking engagement of a gate. In yet one aspect, the slidable member may embody a wheel. In yet a further aspect, the distal end of the expandable barrier includes a guide configured to receive the distal end of the locking member and may be movably coupled to the slidable member.

According to another aspect, a gate may include a detent engagable for holding the locking member in a locked position. In yet another aspect, a gate may include a detent for maintaining the locking member in an inclined position during expansion of an expandable barrier. In another aspect, a detent provides a tactile indication responsive to engagement with a distal end of the locking member. In yet a further aspect, a detent provides an audible indication responsive to engagement with a distal end of the locking member. In another aspect, a gate may include a plurality of detents selectively engagable with a distal end of the locking member.

According to another aspect, a gate includes a first panel and a second panel movably coupled together. A locking member has a pivot end and a distal end in which the pivot end is disposed on the first panel and the distal end is disposed on the second panel. Advantageously, the distal end is configured for linear displacement with the second panel and rotates about the pivot end so as to extend the second panel for the linear displacement.

According to one aspect, a gate includes an expandable barrier having a pivot end and a distal end. The pivot end is laterally disposed from the distal end. A locking member is disposed at the pivot end and extended to the distal end of the barrier. The locking member defines a radial length. A linear displacement of the distal end is a function governed by the radial length minus the product of the radial length times the cosine of a radial angle, as the locking member is rotated to a locking position for extending the barrier to the linear distance.

BRIEF DESCRIPTION OF THE DRAWINGS

The foregoing summary as well as the following detailed description, considered in conjunction with the accompanying drawings, provide a better understanding, in which like reference numbers refer to like elements, and wherein:

FIGS. 8A and 8B are enlarged front elevational views of the adjustable-length locking arm, with a bracket assembly, in locked and unlocked positions, respectively;

DETAILED DESCRIPTION

FIGS. 1-20 illustrate constructions of an adjustable width barrier, such as a gate 100 to prevent movement of an object (such as, but not limited to, a child or a pet for example) through a passageway/walkway opening. In use, the gate 100 is expandable from a first (retracted) position on one side of a passageway opening across the width of the passageway to a second (expanded) position. Once expanded, the gate 100 can be adjusted from an unlocked state to a locked state to securely lock the gate 100 against the vertical sides of the passageway and prevent ingress and egress through the passageway for children and small pets. To remove the gate 100 from the passageway, the gate 100 can be adjusted from the locked state to the unlocked state, and then subsequently retracted into the retracted position. Once retracted, the gate can be removed from the passageway opening to enable unhindered passage through the opening.

Figure 19:
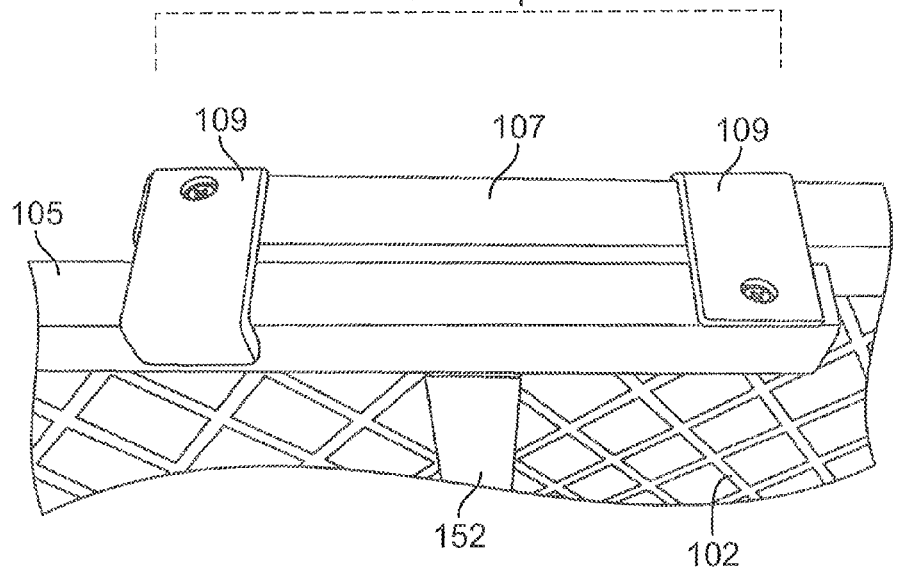
FIG. 19 is an enlarged top perspective view of the gate of FIG. 1 illustrating a panel overlap arrangement.

The gate 100 includes one or more passageway blocking surfaces that are adjustable to span across a passageway. In the depicted construction, the gate 100 includes two interconnected panels 105, 107 configured for relative linear slidable movement to span a width of a passageway opening. The panels 105 and 107 are mechanically coupled to each other via L-brackets 109 so that the panels linearly slide with respect to each other during an expansion or retraction operation. Each L-bracket 109 is affixed to one panel 105, 107 and provides a slot to retain and guide the other panel 105, 107 as seen in FIG. 19.

Figure 1:
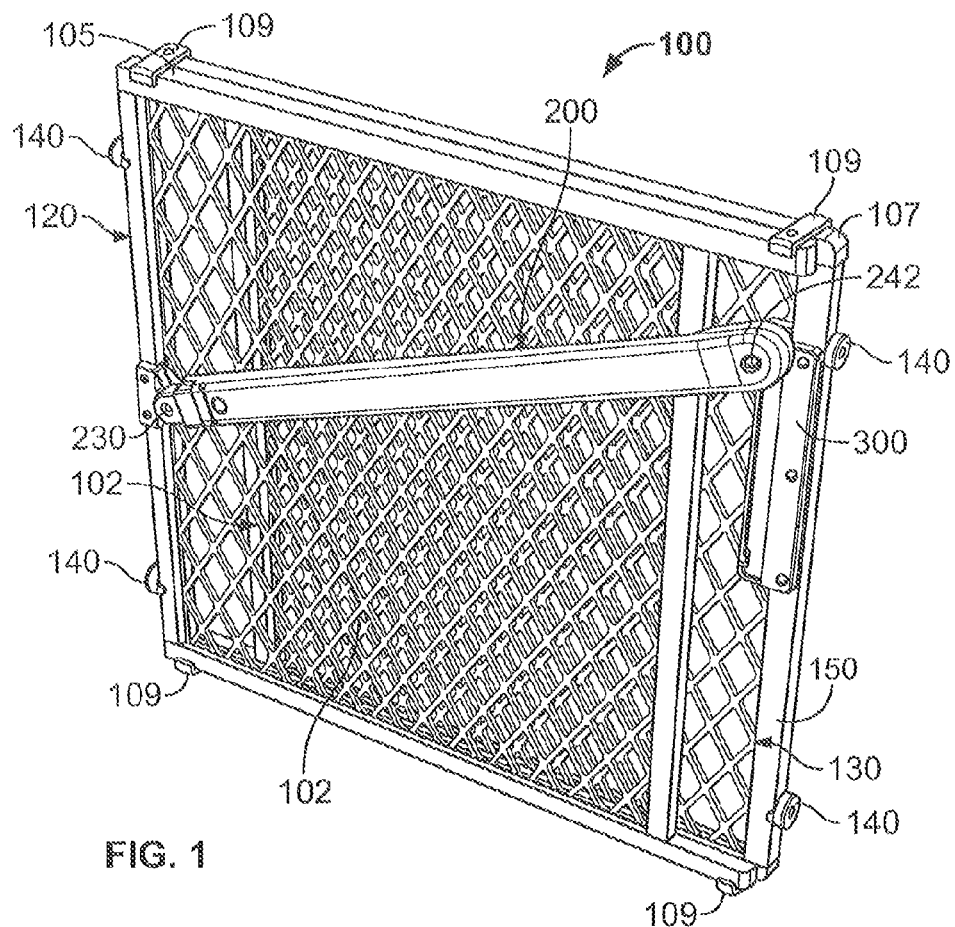
FIG. 1 is a perspective view of a gate in a retracted position according to an embodiment.
Figure 2:
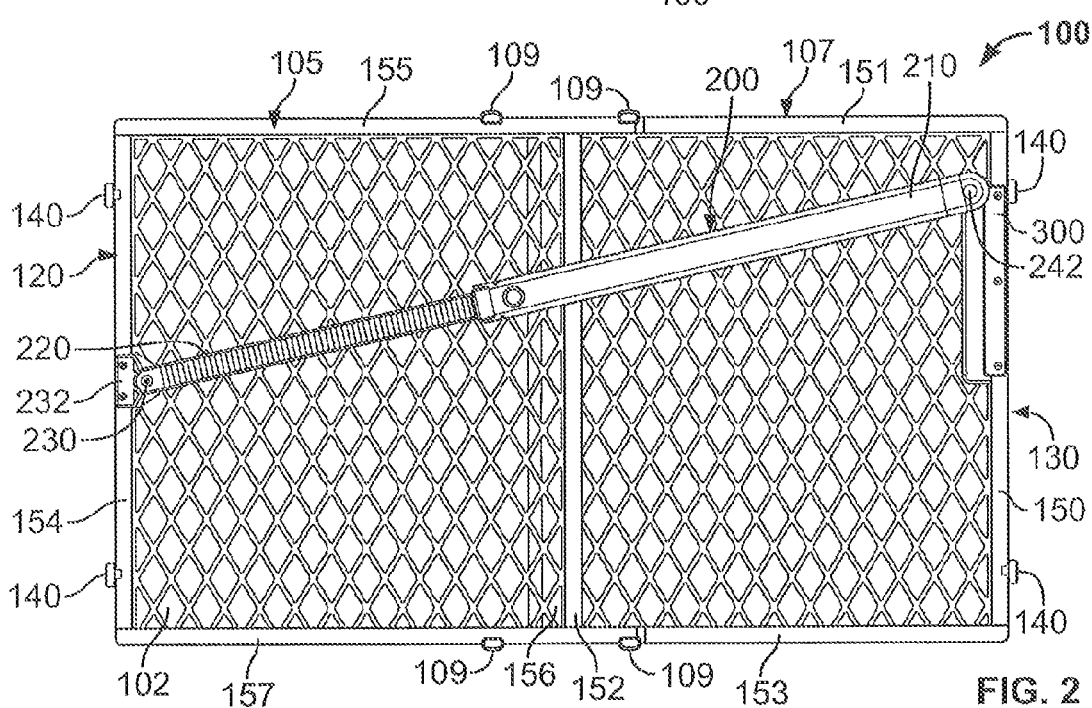
FIG. 2 is a front elevational view of the gate of FIG. 1 in an expanded position and unlocked state.
Figure 3:
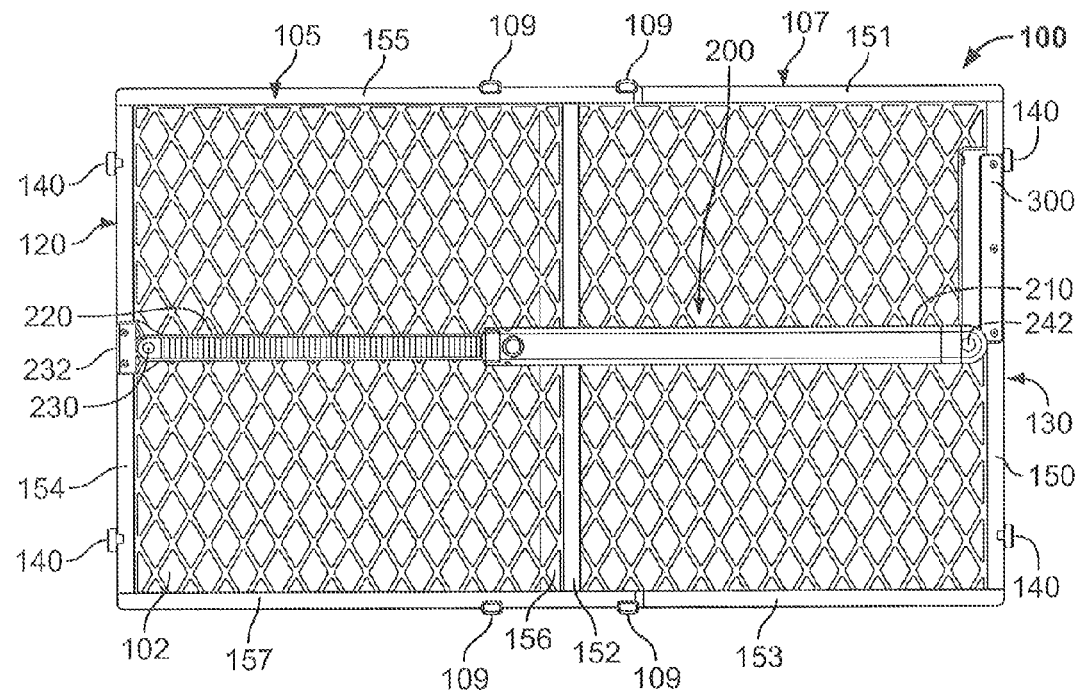
FIG. 3 is a front elevational view of the gate of FIG. 1 in an expanded position and locked state.
Figure 4:
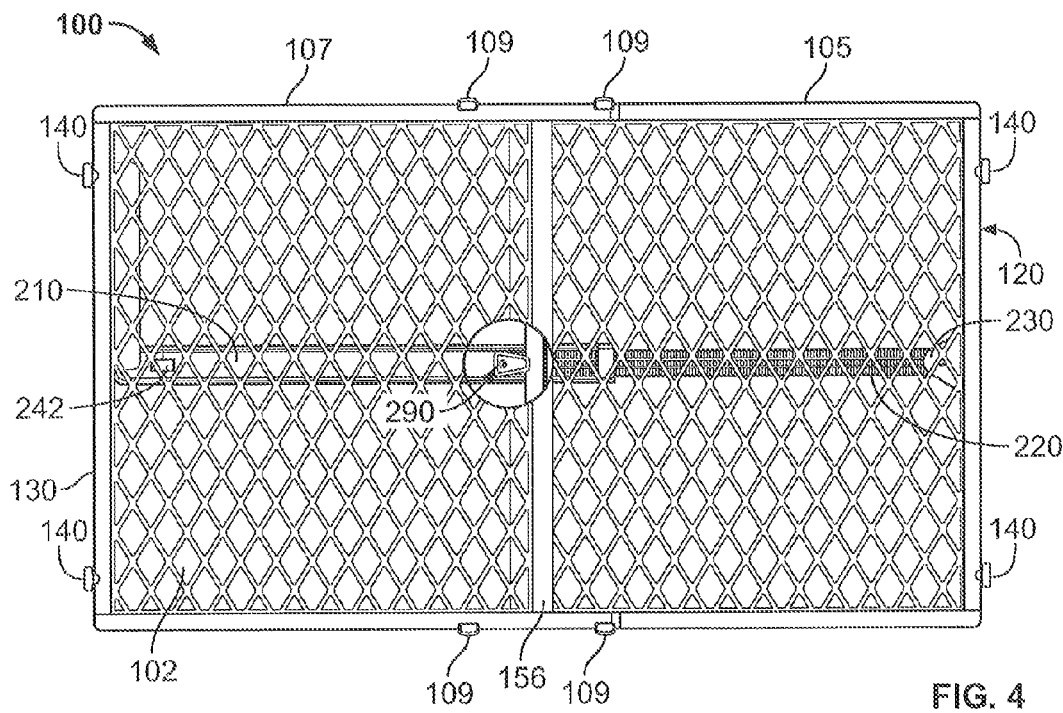
FIG. 4 is a rear elevational view of the gate of FIG. 1 in an expanded position and locked state.

In the construction shown in FIGS. 2 and 3, each of the panels 105, 107 may be formed by a frame and blocking structure within the framed area. Each of the frames of the panels 105 and 107 includes a pair of frame vertical members 152, 154 and 150,156, respectively, and a pair of horizontal frame members 155,157 and 151, 153 that are connected together to form a square or rectangular panel 105, 107. The frame members may be constructed of a desirable material, such as wood, molded plastic or metal.

The panels 105, 107 have a blocking structure within the framed area to prevent passage of small children and pets through the frame, for example. In the depicted construction, the blocking structure can be formed by barrier material 102 which may be in the form of a plastic mesh or nylon mesh. The barrier material 102 may be attached to the panels 105, 107 in any desirable manner. Alternatively, the blocking structure can be a plurality of discrete or interlocking slats that span the framed area of each of the panels 105, 107, such as wood, plastic, or metal bars. In another arrangement, sheet material can be used to span the framed area of panels 105, 107. For example, the sheet material may be a plastic material.

The opposing lateral ends 120, 130 of the gate 100 include a plurality of compressible members 140 to distribute the pressure against the passageway surface and to provide a friction-fit to secure the gate within the passageway. In the depicted arrangement, the opposing lateral ends 120, 130 each includes two spaced compressible members 140 (i.e., upper and lower compressible members). The compressible members mechanically control the amount of compression distance between the opposing lateral ends 120, 130 and the passageway vertical surfaces. The compressible members 140 provide the compression pressure to form a reliable friction fit of the gate 100 to the passageway as the gate is moved from its unlocked state to its locked state. The members 140 are sufficiently compressible to prevent damage to the door or wall vertical surfaces while the gate 100 is in the locked state. The compressible members 140 also limit the minimum distance between the opposing lateral ends 120, 130 and the passageway to prevent pinching of the fingers of the user. The compressible members 140 may be in the form of a myriad of devices. In one construction, the compressible members 140 are of a rubber foot construction. Nevertheless, members 140 can be of an elastomeric or synthetic rubber construction.

Referring to FIGS. 2, 3 5, and 6, the adjustable locking system includes an adjustable-length locking arm 200 coupled at or adjacent each of its ends to a respective panel 105, 107. The adjustable-length locking arm 200 includes a first arm member 220 coupled to the first panel 105 and a second arm member 210 coupled to the second panel 107. More specifically, the first arm member 220 is coupled to panel 105 to enable relative pivotal motion while the second arm member 210 is coupled to panel 107 to enable relative movement along a path such as a linear path. In one arrangement to pivotally couple the first arm member 220 to the panel 105, the first arm member 220 includes a hole at its end 230 and the vertical frame member 154 of the panel 105 includes a pivot bracket 232 mounted thereto. A shaft extends through the first arm member 220 into the pivot bracket 232 to enable relative pivotable movement.

The first and second arm members 220, 210 are movably coupled to each other in any desirable manner to enable extendable and retractable movement. In one arrangement the end of the first arm member 220 travels in a track in the second arm member 210. However, alternate arrangements permitting the extendable and retractable motion can be used. For example, adjustable-length locking arm 200 may have a type of telescopic construction in which the first arm member 220 travels inside a portion of the second arm member 210. Alternatively, adjustable-length locking arm 200 may have a type of telescopic construction in which the second arm member 210 may travel inside of the first arm member 220. The adjustable-length locking arm 200 movement may also be incremental in the extension process, if desired. To enable incremental movement, first arm member 220 includes a series of ridges 240 and grooves 245 extending along its length as is evident from FIGS. 5 and 6. This feature provides for an index sizing system 270 to enable gate 100 to be quickly and accurately pre-sized for a known or previously used passageway opening width. In one construction, ridges 240 and grooves 245 provide for uniform incremental lengths, such as ¼ inches or other incremental values to provide predetermined adjustable widths of gate 100.

The ridges 240 and grooves 245 can be formed in any shape to serve the desired function of engaging and mating with the first arm member 220 so as to provide structural support and incremental locking at a plurality of discrete width positions for the gate 100. Nonetheless, the engaging surface may have a corrugated or a wavy configuration for support and locking characteristics. In other arrangements, ridges 240 and grooves 245 may be formed in a triangular, pyramidal, frustopyramidal, or other shape so as to allow engagement and disengagement from the first arm member 220. The locking arm 200 can be constructed of an appropriate material for the intended use. For example, the locking arm 200, including the first arm member 220 and second arm member 210, can be a molded plastic construction such as of acrylonitrile butadiene styrene (ABS) plastic or nylon.

Figure 5:
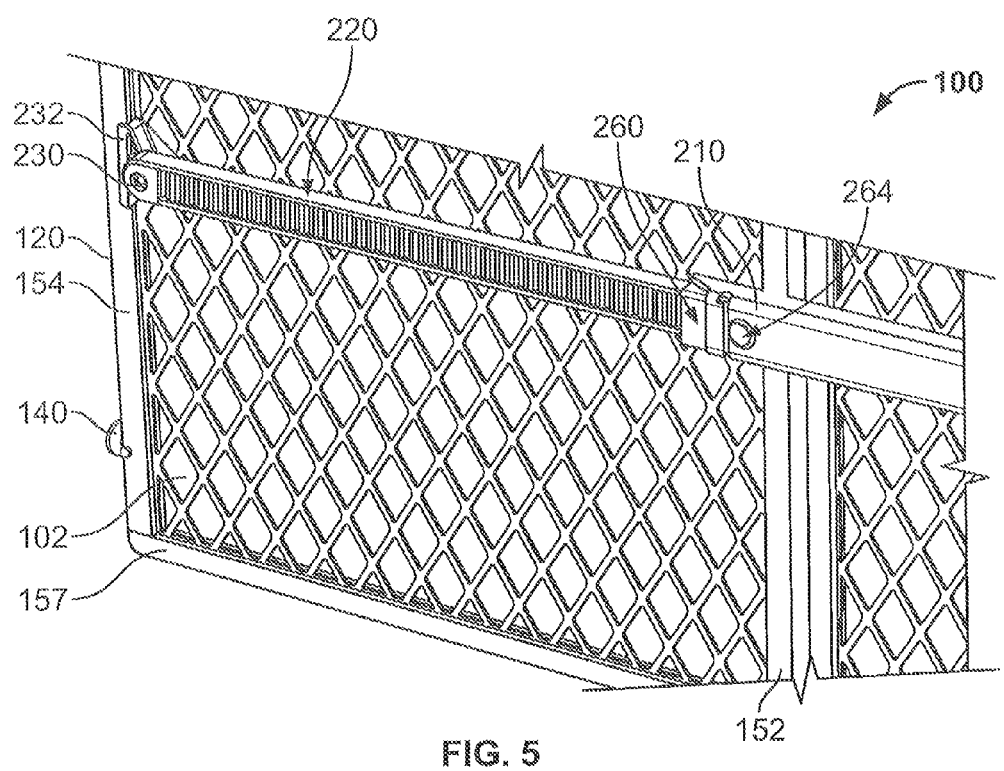
FIG. 5 is an enlarged perspective view of part of the gate locking system with an adjustable-length locking arm according to an embodiment.
Figure 6:
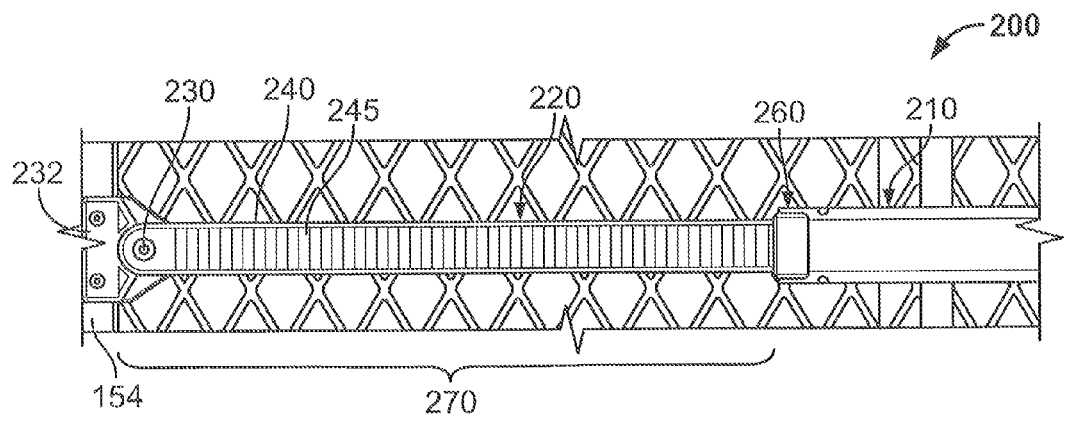
FIG. 6 is an enlarged front elevational view of the gate locking system and adjustable-length locking arm shown in FIG. 5.
Figure 7:
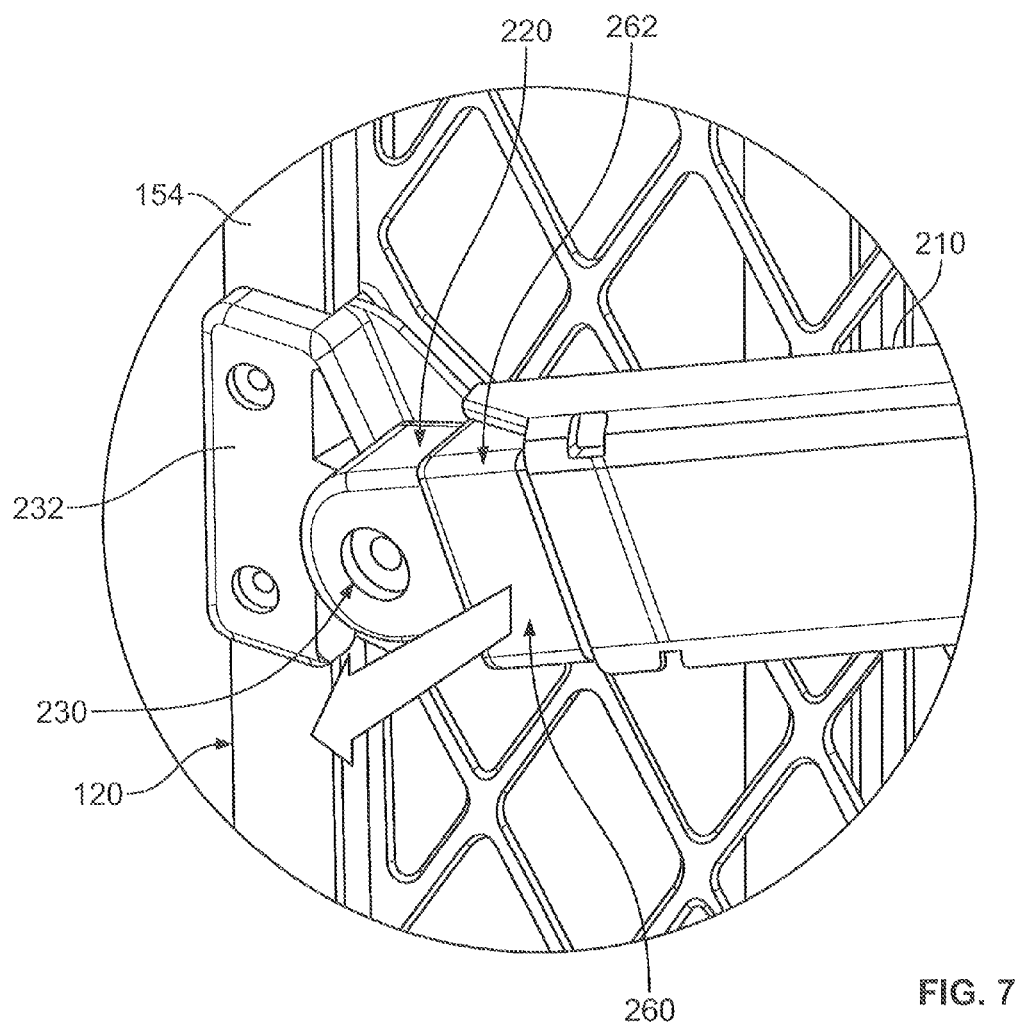
FIG. 7 is an enlarged perspective view of the pivot attachment arrangement between the adjustable-length locking arm and the frame of a gate panel according to an embodiment.

Referring to FIGS. 5-7, the second arm member 210 includes a pivotable lock tab 260 resiliently biased to reliably engage the grooves 245 of the first arm member 220. As seen in FIG. 7, the pivotable lock tab 260 includes an extended key end 262 that is spring biased against the grooves. As shown in FIG. 5, a button 264 may be optionally provided on the second arm member 210 to pivot the tab 260 upwardly, or outwardly, away from the grooves 245 and thereby release the key end 262 from the ridges 240 and grooves 245 of the first arm member 220. This enables free retraction of the adjustable-length locking arm 200. Alternatively, a user can simply lift the tab 260 upwardly, or outwardly, to pivot the key end 262 to place the adjustable-length locking arm 200 in a state permitting retraction.

In general, this arrangement functions like a linear ratcheting system. In the extension direction, the user may freely move the opposing ends of the gate 100 away from each other. This causes the second arm member 210 to extend relative to the first arm member 220 one ridge/groove 240/245 at a time. An audible feedback is produced each time the key end 262 engages the next ridge/groove 240/245. However, the physical arrangement prevents the unintended retraction of the adjustable-length locking arm 200. To retract the adjustable-length locking arm 200, the user must either press button 264 or lift tab 260 and then slide the opposing lateral ends of the gate 100 toward each other.

Referring to FIGS. 8A through 11, the end of the adjustable-length locking arm 200 opposed from end 230, is formed by the distal end 242 of the second arm member 210. This distal end 242 is movably coupled to the vertical frame member 150 of the second panel 107. The second panel 107 includes a guide bracket 300 mounted to the vertical frame 150. The guide bracket 300 includes a guide track formed by a channel 310. The distal end 242 of the second arm member 210 is mounted in the channel 310 for movement along a fixed pathway. The guide bracket 300 can be constructed of an appropriate material for the intended use. For example, the bracket 300 can be of a molded construction of ABS or nylon. As shown in the depicted embodiment in FIGS. 8A, 8B and 11, the fixed pathway is linear and vertical and enables relative vertical movement between the distal end 242 of the adjustable-length arm 200 and the frame member 150. The principles disclosed herein can be employed in a wide variety of gate configurations. For example, in an alternative embodiment, a guide bracket channel may have an arcuate track and corresponding arcuate pathway to accomplish similar results and benefits of guide bracket 300.

Figure 8D:
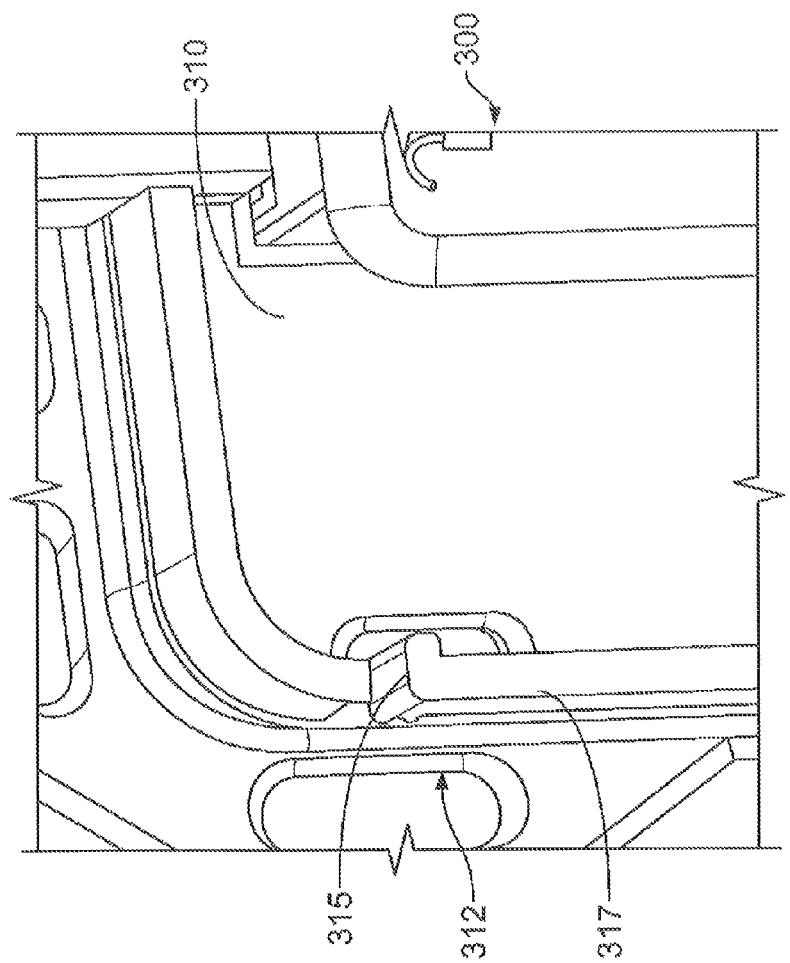
FIG. 8D is an enlarged front perspective view of the bracket assembly showing a detent construction according to an embodiment.
Figure 8C:
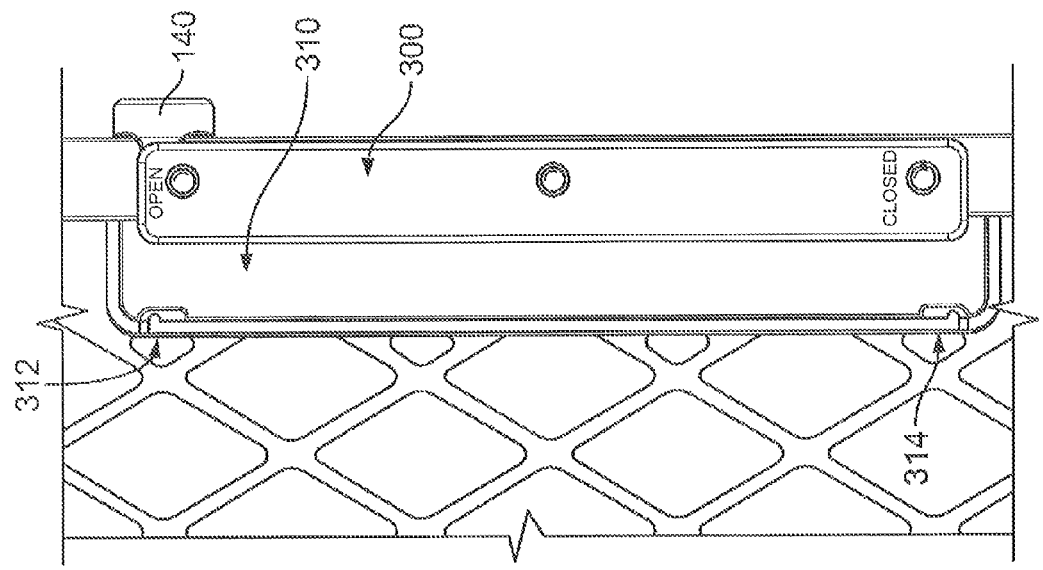
FIG. 8C is an enlarged front elevational view of the bracket assembly according to an embodiment.

Referring to FIG. 8C, the guide bracket 300 has two laterally disposed detents 312, 314 on the inside surface at the top and bottom parts of the guide channel 310, respectively. The upper detent 312 operates to retain the adjustable-length locking arm 200 in the upper angled position (i.e., to maintain the gate 100 in its unlocked state) until a predetermined threshold downward force is applied to move the adjustable-length locking arm 200 to a lower (e.g., substantially horizontal) position and lock the gate 100. The lower detent 314 operates to retain the adjustable-length locking arm 200 in its lower position (i.e., to maintain the gate 100 in its locked state) until a predetermined threshold upward force is applied to move the adjustable-length locking arm 200 to its upper angled position and unlock the gate 100. In the depicted embodiment, both detents 312, 314 have the same construction. In alternative embodiments, the guide bracket 300 may include an additional detent or a plurality of detents laterally disposed between detent 312 and detent 314. In this construction, the one or more detents can be provided on the inside surface between the top and bottom parts of the guide channel 310. The additional detents can be spaced at regular intervals or at any distance between the top and bottom parts of the guide channel 310. Similar to detent 312, 314, each of the detents can be separately engagable with the distal end 242 of adjustable-length locking arm 200 and can provide refined control of the horizontal displacement of panel 107 in coordination with the pivoting of adjustable-length locking member 200.

In the enlarged detailed view of FIG. 8D, the detent 312 is formed from an extension leg 317 and protrusion 315. The extension leg 317 is coupled to the protrusion 315 on the inner wall of the channel 310. The extension leg 317 provides that protrusion 315 is biased to pivot once an object abuts protrusion 315. Any desirable biasing arrangement may be used, such as a leaf spring. The elements of the detent 312 can be integrally molded with the channel 310 of the guide bracket 300 or separate elements attached together. Alternatively, the detents 312, 314 can be of a non-biased construction in the inside surface of the channel 310. In such an alternative construction, the protrusion 315 may extend from the inner wall of the channel 310. The operation of the detents 312, 314 will be further explained in conjunction with distal end 242 of second arm member 210.

Figure 9A:
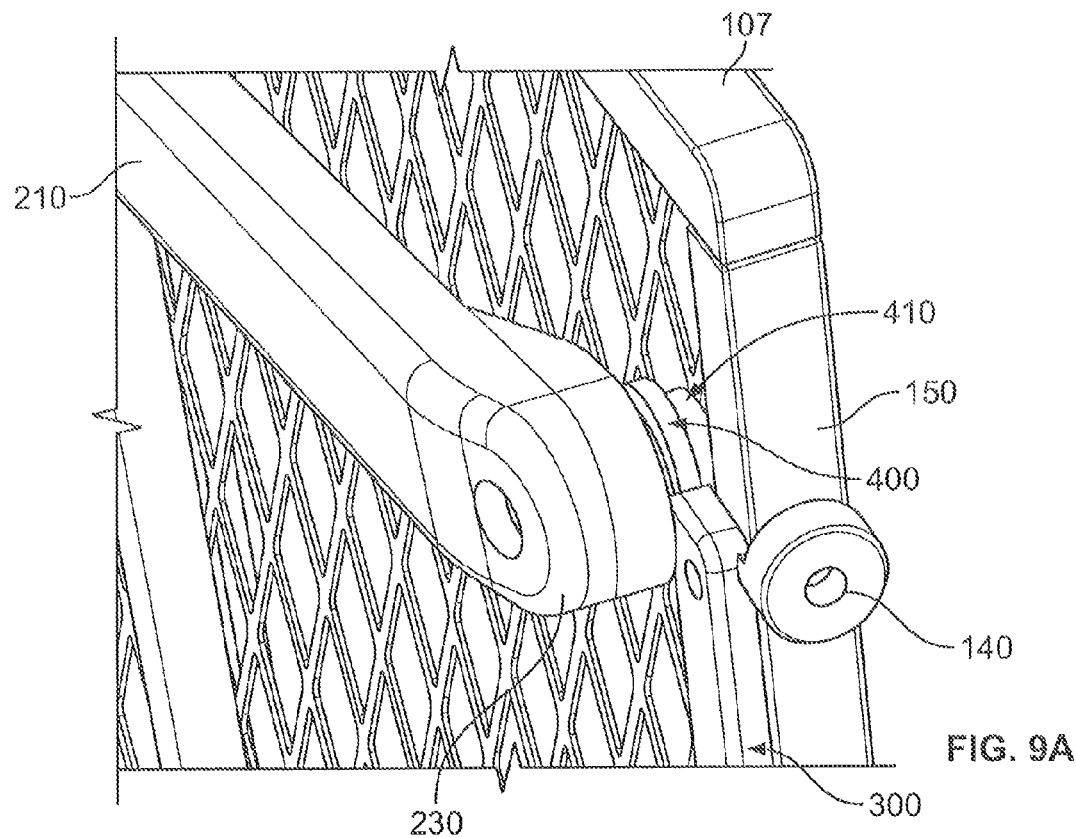
FIG. 9A is an enlarged front perspective view of the adjustable-length locking arm and bracket assembly shown in FIGS. 8A and 8B.
Figure 9B:
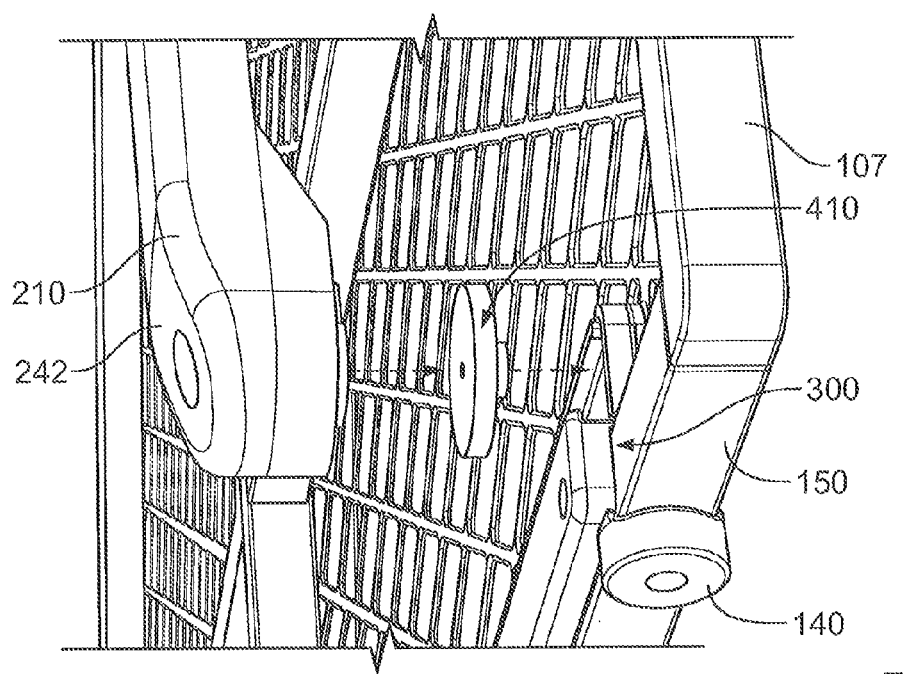
FIG. 9B is an exploded assembly view of the adjustable-length locking arm and bracket assembly shown in FIG. 9A.
Figure 11:
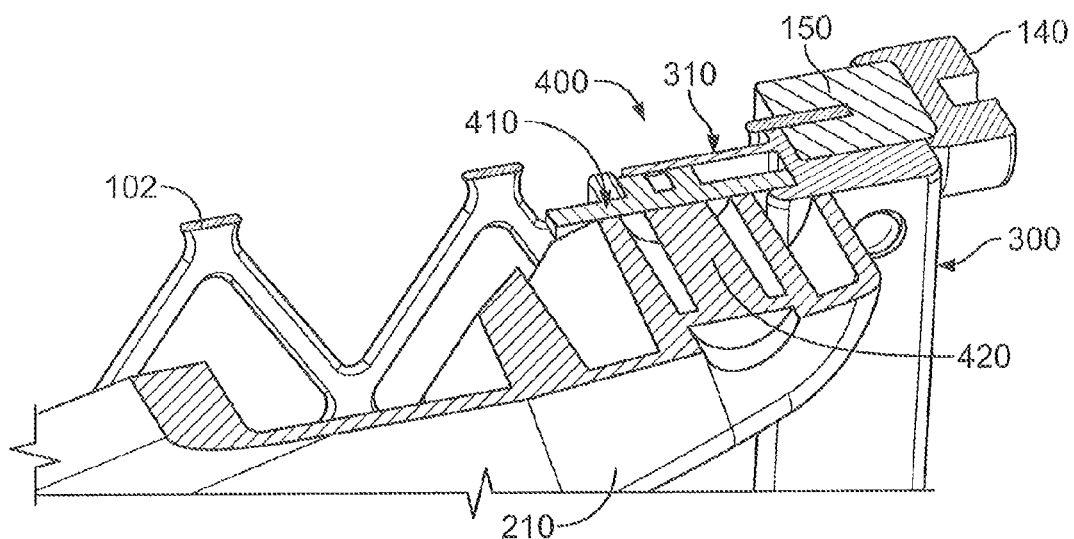
FIG. 11 is a three dimensional cross-sectional view of the locking arm and bracket assembly taken along line 11-11 in FIG. 10.
Figure 12:
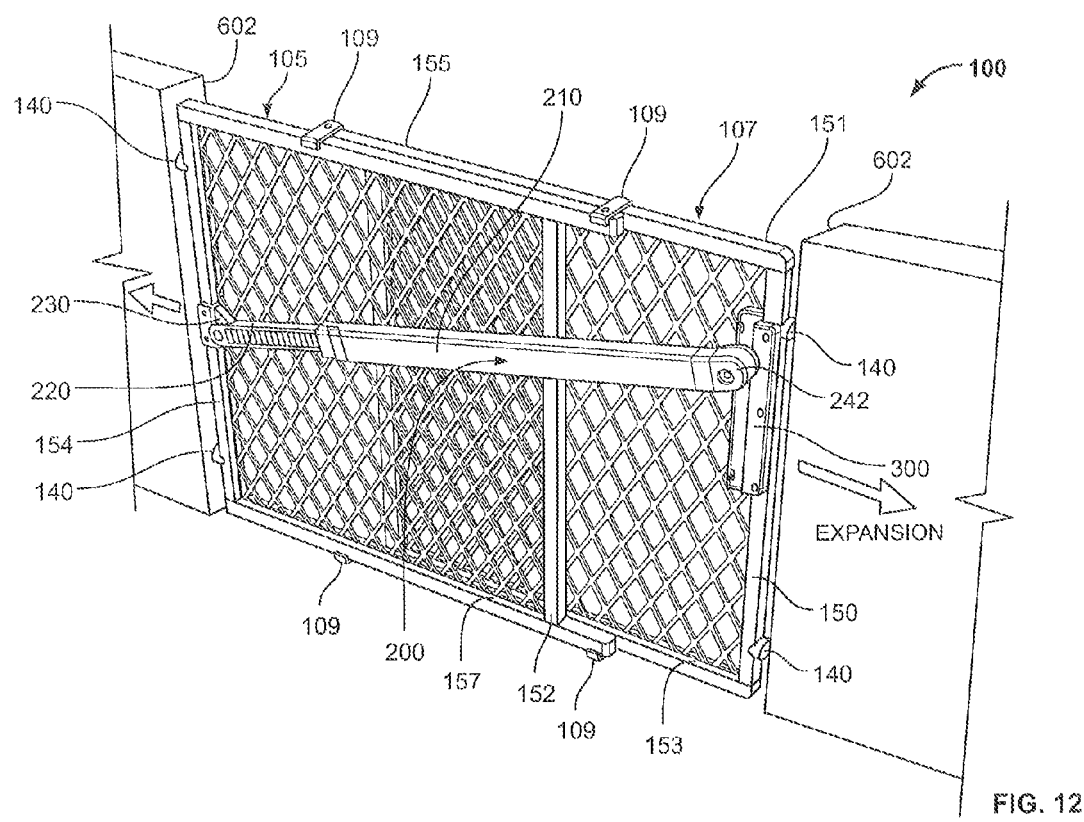
FIG. 12 is a perspective view of the gate of FIG. 1 in an expanded position and an unlocked state in a passageway opening and illustrating an expansion operation.

Referring to FIGS. 9A, 9B and 11, in the depicted embodiment, the distal end 242 of the second arm member 210 includes a wheel 410 that assists in the movement within guide bracket channel 310 by creating a rolling relationship. If desired, the wheel 410 can be part of a wheel assembly 400 to provide a smaller diameter disc on top of a larger diameter disc that work in conjunction to enable the adjustable-length locking arm 200 to easily rotate and lock securely into place with respect to the guide bracket 300.

Referring to FIG. 11, the wheel assembly 400 includes a shaft 420 rotatably coupled to the wheel 410. As seen FIGS. 9A and 9B, wheel 410 travels along the channel 310 of the guide bracket 300 to provide the movable coupling of the second arm member 210 along the frame 150 of the second panel 107. As can be understood from FIGS. 8C and 8D, the inside surface at the bottom of the guide bracket 300 includes detent 314 to provide an audible 'Click-Lock' sound during abutment with the second arm member 210 for enhanced user feedback confirmation that the gate has securely been placed in the locked state. The abutment response also can be felt by the user due to a slight vibration/movement of the second arm member 210. The physical engagement provides for a tactile feedback response to the user holding the adjustable-length locking arm 200.

In alternative embodiments, the distal end 242 of the second arm member 210 may include a slidable member in the form of a fixed non-rolling member in lieu of a rotating wheel. The non-rotating member can vertically slide within channel 310 of guide bracket 300. The non-rotating member could be provided in any desirable shape and may have a curved perimeter to aid in the sliding in the channel 310. The slidable member may be provided in the shape of a wheel. It may alternatively be fastened to the second arm member 210 or integrally molded to the distal end 242. Additionally, to further aid in the sliding process, the member sliding in the channel 310 and the channel 310 may be of plastics or other materials to provide a wear resistant, low friction relationship. Furthermore in one embodiment, the detents 312, 314 can provide an audible indication responsive to engagement with the slidable member, such as a wheel shaped member.

Figure 9C:
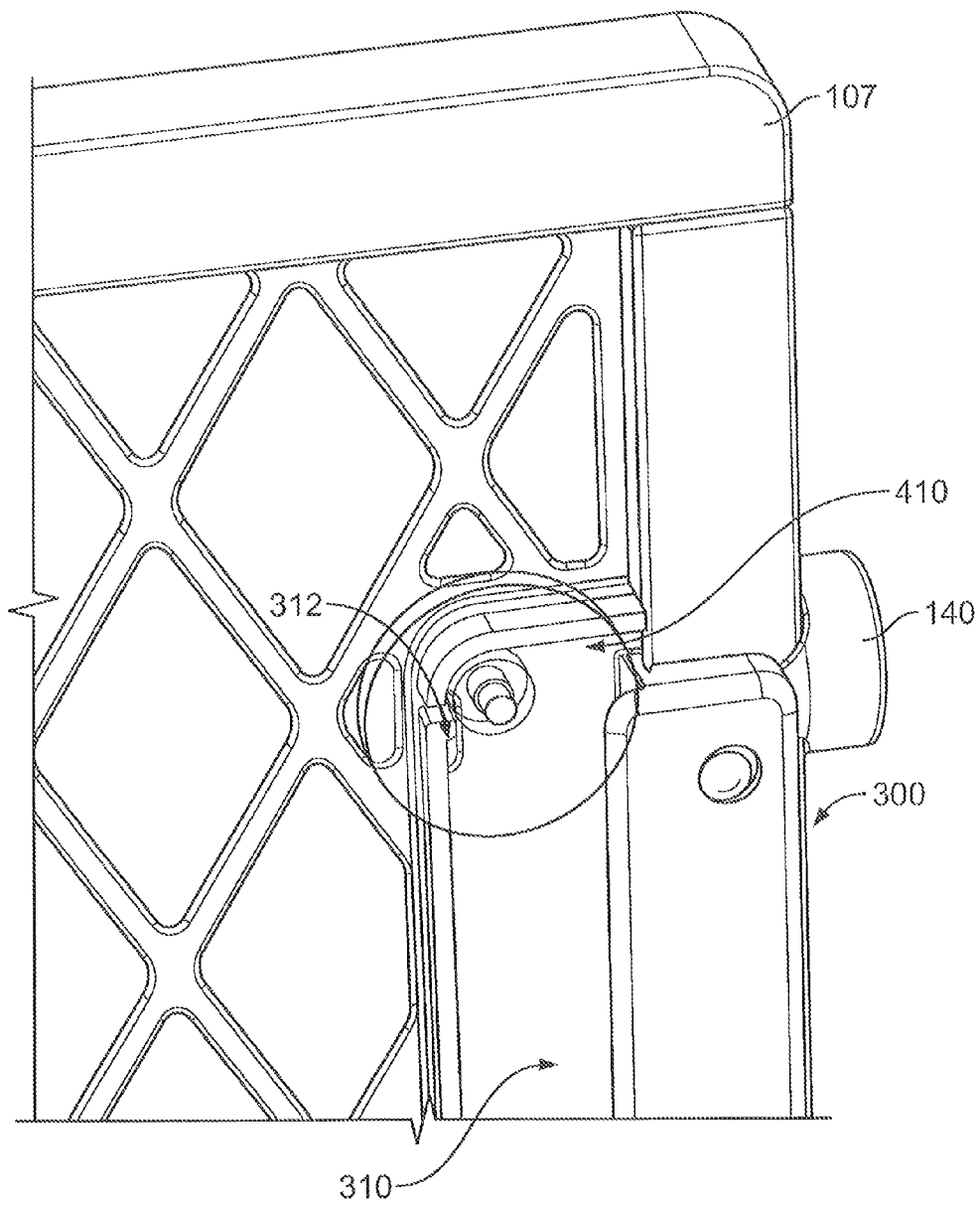
FIG. 9C is an enlarged front perspective view of the bracket assembly with a wheel shown in phantom illustrating a retaining engagement according to an embodiment.
Figure 10:
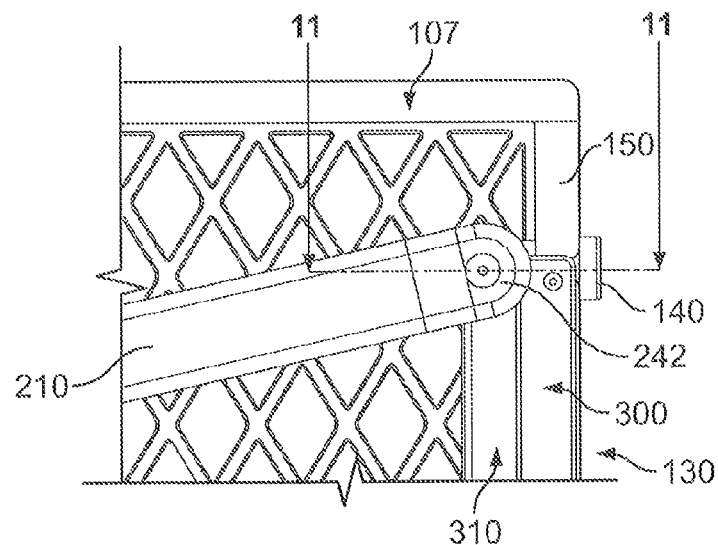
FIG. 10 is an enlarged front elevational view of the adjustable-length locking arm and bracket assembly shown in FIG. 8.

Additionally, the upper detent 312 retains the distal end 242 of the adjustable-length locking arm 200 in its upper angled position when the gate 100 is moved between expanded and retracted positions. This enables the adjustable-length arm 200 to easily extend while a user is adjusting the width of the gate 100 for an opening. In FIG. 9C, the adjustable-length locking arm 200 has been removed for clarity to show how the upper detent 312 abuts wheel 410 (smaller diameter disc). When in the unlocked state, the distal end 242 of the adjustable-length locking arm 200 is maintained in its upper angled position and the detent 312 resists unintended movement to the locked position due to gravity and minor unintended forces. In general, the adjustable-length locking arm 200 is maintained at an inclined relationship with respect to the pivotal end 230 during expansion of the gate 100. As gate 100 is expanded, the second arm member 210 extends relative to the first arm member 220 one ridge/groove 240/245 at a time. This arrangement enables a one-handed operation for a given width of the gate 100. For example, in the locked horizontal state of adjustable-length locking arm 200, the user can simply rotate the arm 200 upward to the unlocked position using one-hand. The gate 100 will retract slightly to enable the user to remove it from an opening. The user can then reposition the gate 100 in other openings or in the same opening at a later time.

Figure 20:
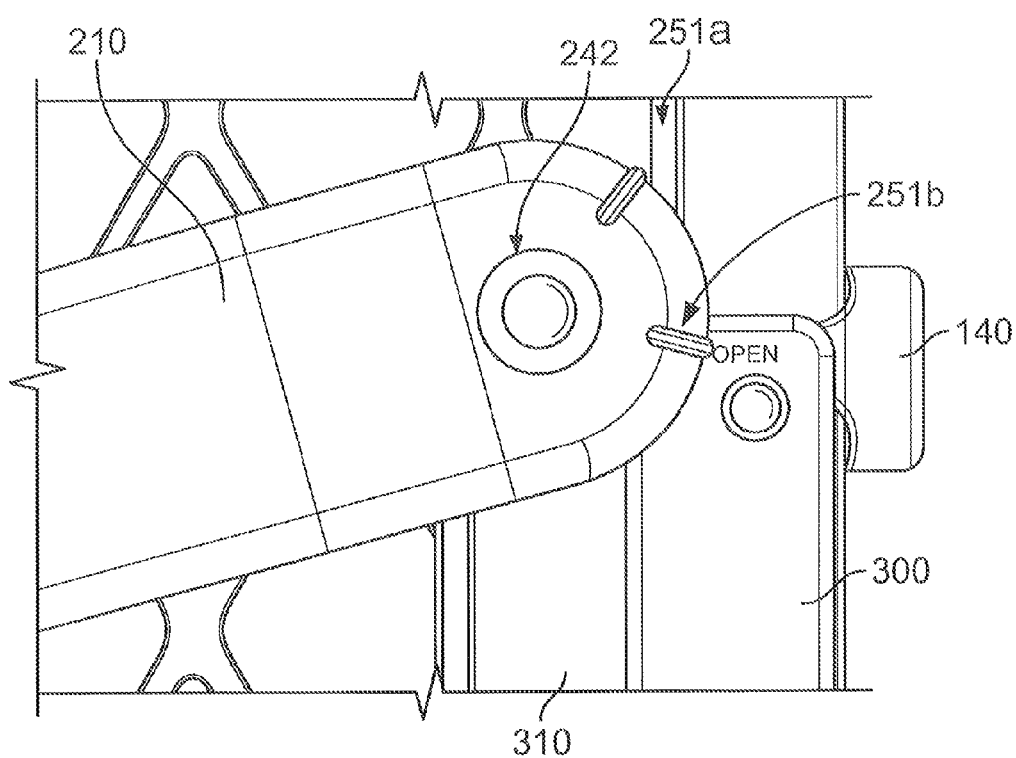
FIG. 20 is an enlarged front elevational view of the gate of FIG. 1 illustrating visual cueing features for moving the gate between locked and unlocked states.

As shown in FIGS. 8A, 8B, 8C and 20, the gate 100 may optionally have a visual indicator feedback system to let the user know whether gate 100 is in its locked or unlocked state. In the depicted embodiment, the distal end 242 of the second arm member 210 includes upper and lower indicators 251*a* and 251*b*. The guide bracket 300 includes a visual indicator, such as indicia at its upper end to indicate that the gate 100 is open/unlocked and indicia at its lower end to indicate that the gate 100 is closed/locked. The indicia may either be text, such as the words "OPEN" and "CLOSED" or may be symbols that the user would quickly associate with those states, such as an open lock symbol and a closed lock symbol. As shown in FIG. 20, when the gate 100 is unlocked, the locking arm 200 is in its upper angled position and the lower indicator 251*b* aligns with an "OPEN" indicia in text and/or an opened lock symbol on the top part of the guide bracket 300. In this state, the upper indicator 251*a* is positioned and pointed so as not to be aligned with the guide bracket 300. As can be understood from FIGS. 8A, 8B and 8C, when the gate 100 is locked, the locking arm 200 is in its lower position and the upper indicator 251*a* aligns with an "CLOSED" indicia in text and/or an closed lock icon on the lower part of the guide bracket 300. In this state, the lower indicator 251*b* is positioned and pointed so as not to be aligned with the guide bracket 300.

The operation of the gate 100 is described generally with reference to FIGS. 12-15. Initially, the gate 100 is in a retracted position or is pre-expanded to the desired size of a passageway opening 600 between laterally disposed vertical surfaces 602. If the gate 100 is in its pre-expanded position for a known passageway 600, it is positioned across the passageway opening 600 to be blocked with the gate 100. If gate 100 is moved to the passageway 600 in its retracted position, the gate 100 is expanded across the passageway opening 600 by moving the second panel 107 away from the first panel 105 or extending the adjustable-length locking arm 200 until the opposing lateral ends 120, 130, are abutting against or very close to the lateral vertical surfaces 602 of the passageway opening 600. At this point, the gate 100, is in its expanded position and unlocked state. In the unlocked state, visual feedback is provided to the user as the indicator 251*b* is aligned with the OPEN indicia on the guide bracket 300.

Referring back to FIG. 6, during this extension operation, the key end 262 of the pivotable lock tab 260 travels and abuts the ridges 240 in the index sizing system 270 by way of the spring biased configuration. The user may hear continuous sound of high pitch "clicks" as the lock tab 260 travels. This feature provides the user with audible feedback of the expansion operation. This moves the gate 100 from its retracted position to its extended position, but it is still in an unlocked state.

Figure 13:
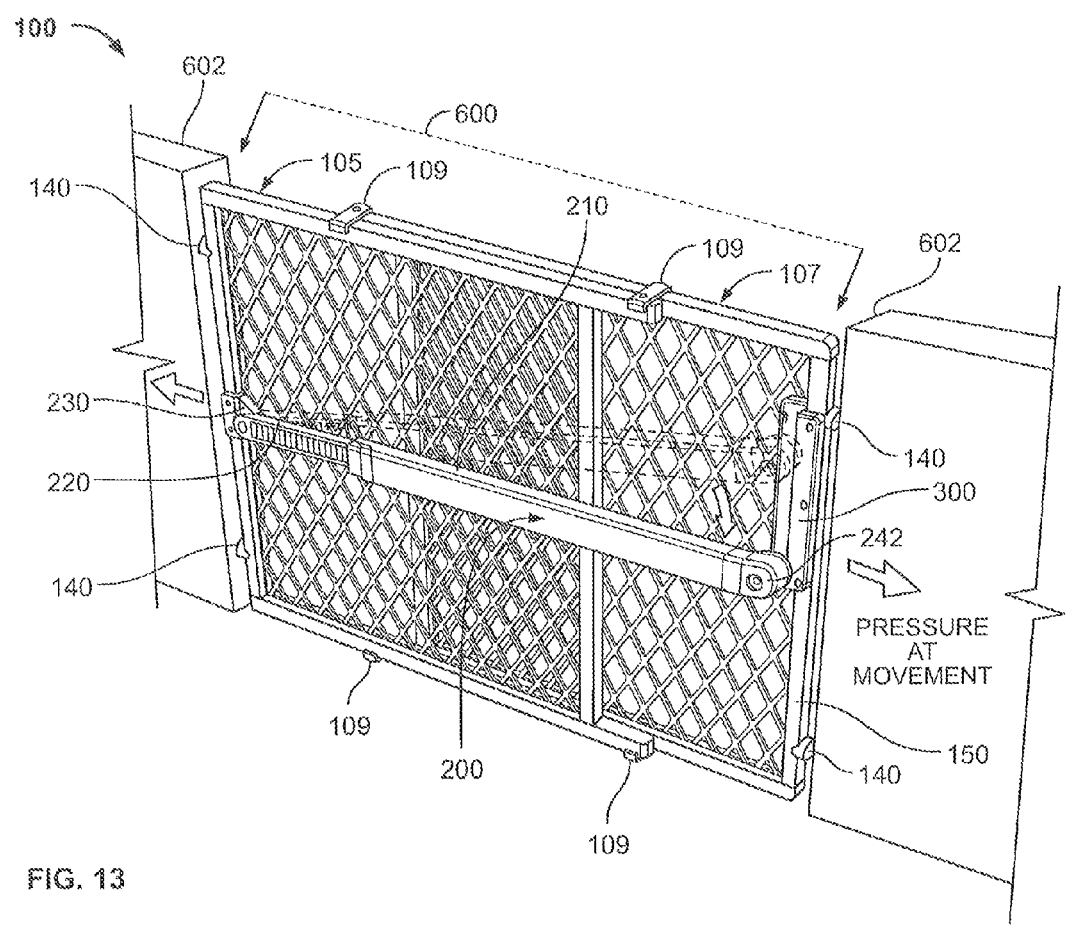
FIG. 13 is a perspective view of the gate of FIG. 1 in an expanded position and a locked state in a passageway opening and illustrating a locking operation.

As shown in FIG. 13 after the gate 100 is in an extended position, the user changes the gate 100 from its unlocked state to its locked state by rotating the adjustable-length locking arm 200 downwardly towards a lower substantially horizontal position. As can be understood from FIGS. 8B, 8C and 8D, the user simply provides a downward force to overcome the resistance by the upper detent 312. The user continues to provide the force in a clockwise direction towards the lower substantially horizontal position until the user hears or feels a 'Click Lock' provided by the lower detent 314. This confirms to the user that the gate 100 is reliably secured across the opening 600 of the passageway. The user also receives visual feedback of the locking position by way of the alignment of the CLOSE indicator 251a on distal end 242 of second arm member 210. This rotation of the adjustable-length arm 200 causes the second panel 107 to be pushed away from the first panel 105 to extend the gate 100 another supplemental amount due to its geometry. This causes the compressible members 140 to compress against the vertical surfaces 602 of the passageway opening 600. This engagement and compression causes a tight friction lock between the gate 100 and vertical surfaces 602 of the passageway opening 600 as the gate 100 is moved into its locked state. In this locked state, the gate 100 will prevent small pets and children from going through the passageway opening and the lower detent 314 will maintain the gate 100 in this locked state until the desired unlocking force is applied.

Figure 14:
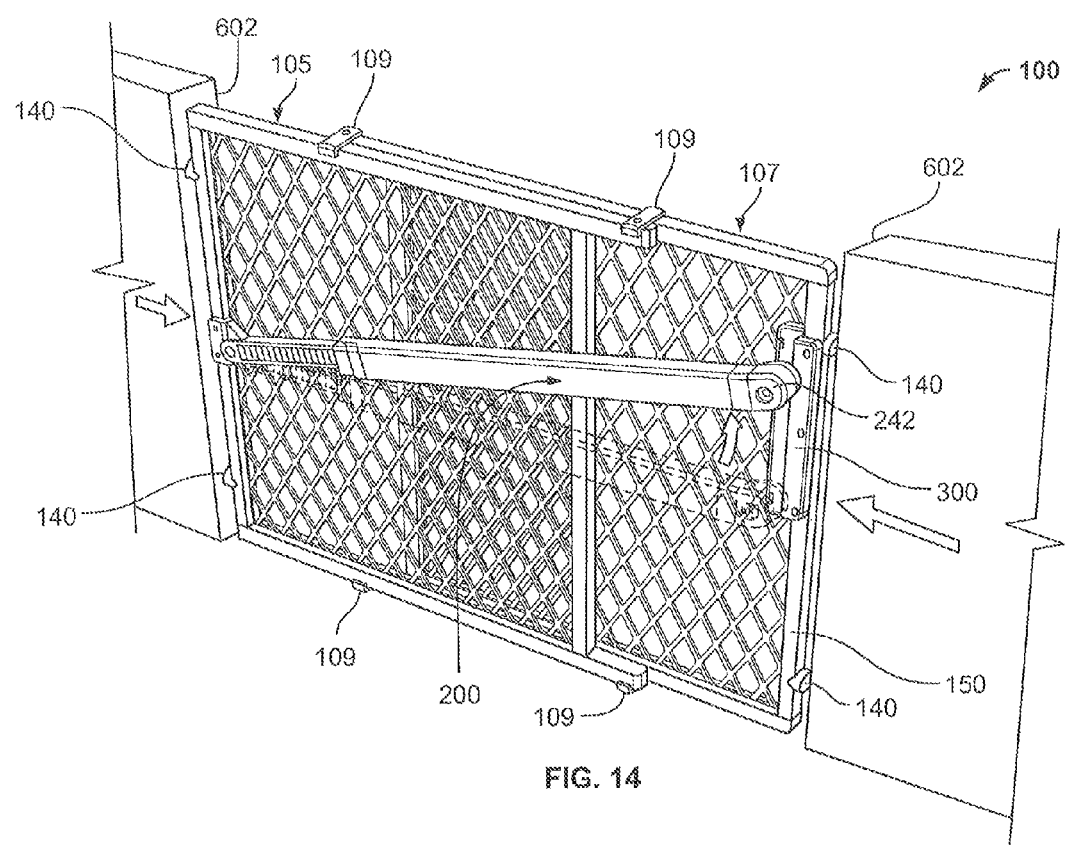
FIG. 14 is a perspective view of the gate of FIG. 1 in an expanded position and an unlocked state in a passageway opening and illustrating an unlocking operation.

As shown in FIG. 14, the locking arm 200 is rotated counter-clockwise to unlock the gate 100 from the opening 600 so as to move the gate to the unlocked state from its locked state. As can be understood from FIGS. 8B, 8C and 8D, to accomplish this movement to the unlocked state from the locked state, the user provides an upward force to overcome the resistance provided by the lower detent 314. The user continues to provide the force in a counter-clockwise direction towards the upper angled position until the user hears or feels a 'Click Lock' provided by the upper detent 312. This confirms to the user that the gate 100 is unlocked and can be retracted. This physical engagement of the upper detent 312 provides for an audible and a tactile feedback response to the user. The user also receives visual feedback of the unlocking position by way of the alignment of the OPEN indicator 251b on distal end 242 of second arm member 210 as shown in FIGS. 8B and 20. The counter-clockwise movement modifies the angular positioning of the adjustable-length arm 200 so that it no longer applies a force to keep the compressible members 140 in their compressed condition. It further may enable the panels 105 and 107 of the gate 100 to be retracted by a small amount to be spaced slightly away from the vertical surfaces 602.

Figure 15:
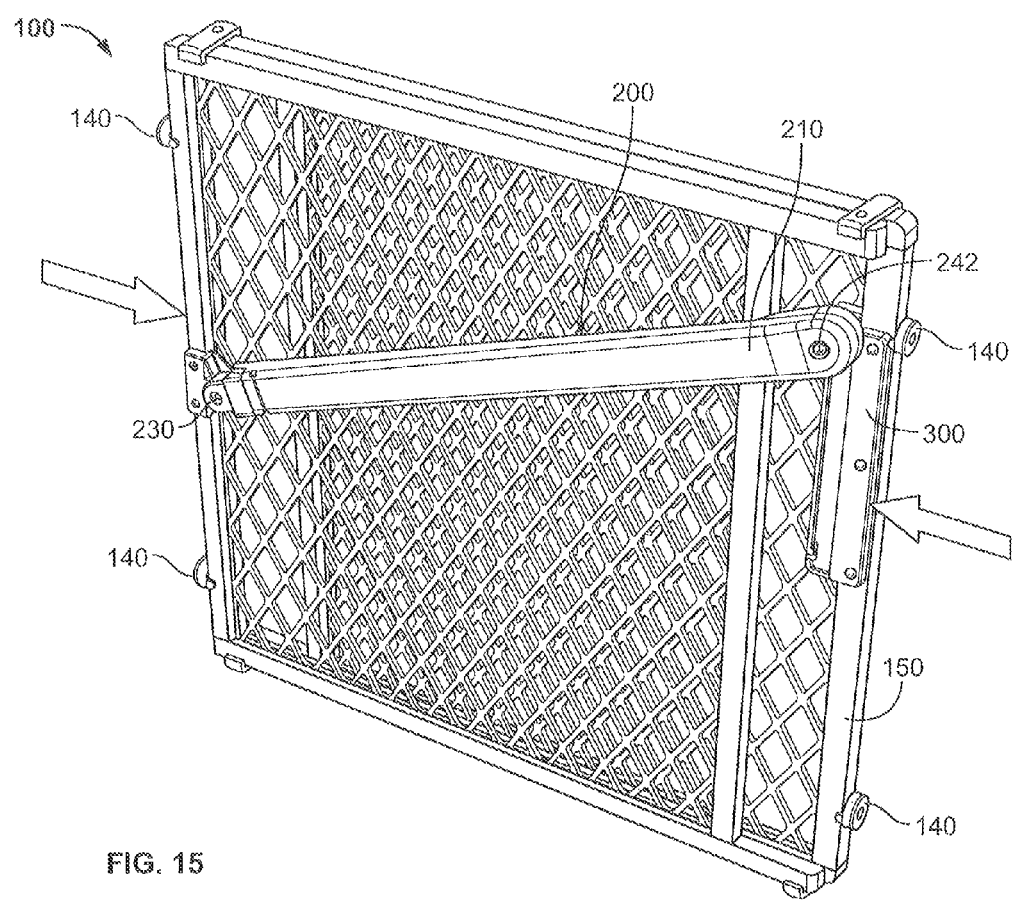
FIG. 15 is a perspective view of the gate of FIG. 1 in a compact retracted position in a passageway opening and illustrating a retraction operation.

As shown in FIG. 15, the gate 100 may be moved from an extended position to a retracted position. As discussed with respect to FIGS. 5-7, to accomplish this movement, the pivotable lock tab 260 is pivoted upwardly or the button 264 is depressed so that the pivotable lock tab 260 is disengaged from the ridges 240 and grooves 245 and the key end 262 travels above ridges and grooves of the index sizing system 270. Once the pivotable lock tab 260 is disengaged from the ridges 240 and grooves 245, the user may move the gate 100 from its extended position to its retracted position by moving the second panel 107 toward the first panel 105 or retracting the adjustable-length locking arm 200.

The locking arm 200 with the index sizing system 270 enables the gate 100 to remain at a preset expanded width. When the gate 100 is removed from the opening, the user does not have to repeatedly reset or resize the gate width when using the same opening frequently. The user simply needs to replace the gate 100 in the opening and perform the one-handed locking operation as disclosed previously.

During the rotational movement of the adjustable-length locking arm 200 as the gate 100 is moved from its unlocked state to its locked state, the distal end 242 of the adjustable-length locking arm 200 travels on a circular path relative to its pivot end 230. This is because the length of the adjustable-length locking arm 200 is fixed and one end is pivotally coupled to the end of the panel 107. As the distal end 242 travels on the circular path, it pushes the first and second panels 105, 107 away from each other for additional extension and moves along its fixed path, which can be vertical or substantially vertical, as the distal end 242 travels along the guide bracket 300. Thus, during the locking step, the distal end 242 of the telescopic locking arm 200 simultaneously: (a) moves along a fixed radial path with respect to the other end 230 of the adjustable-length locking arm 200; (b) moves substantially linearly and vertically with respect with respect to the guide bracket 300 and the second panel 107; and (c) moves in a horizontal direction with respect to the second panel 107 to further extend the gate 100 and provide a press-fit attachment to the opposing vertical surfaces of passageway 600.

Figure 16A:
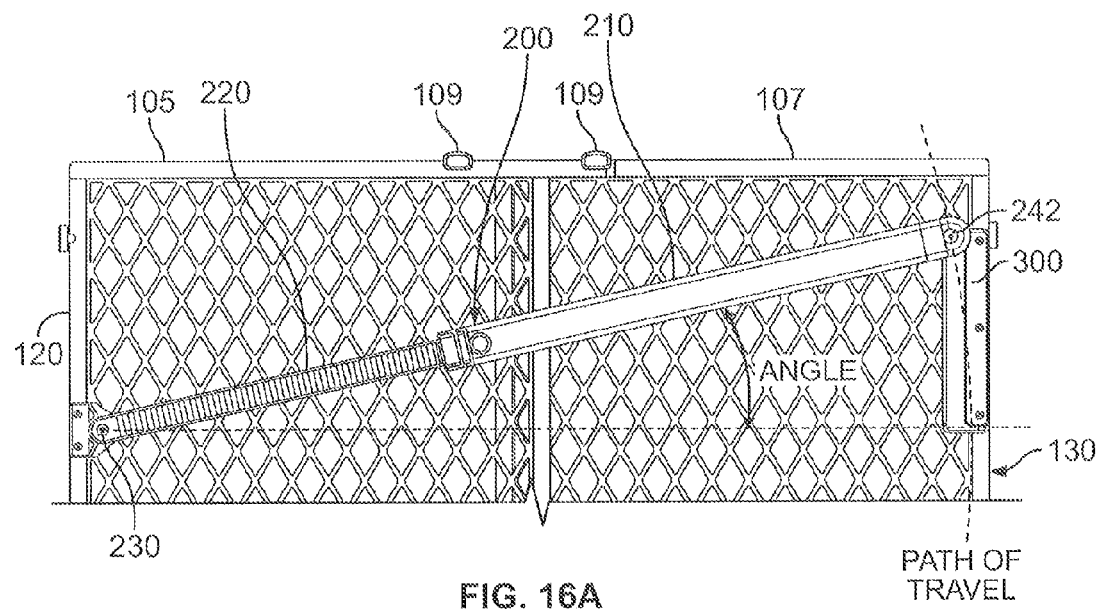
FIGS. 16A and 16B are front elevation and schematic views of the gate of FIG. 1 illustrating mathematical relationships of the displacement paths of the locking arm.
Figure 16B:
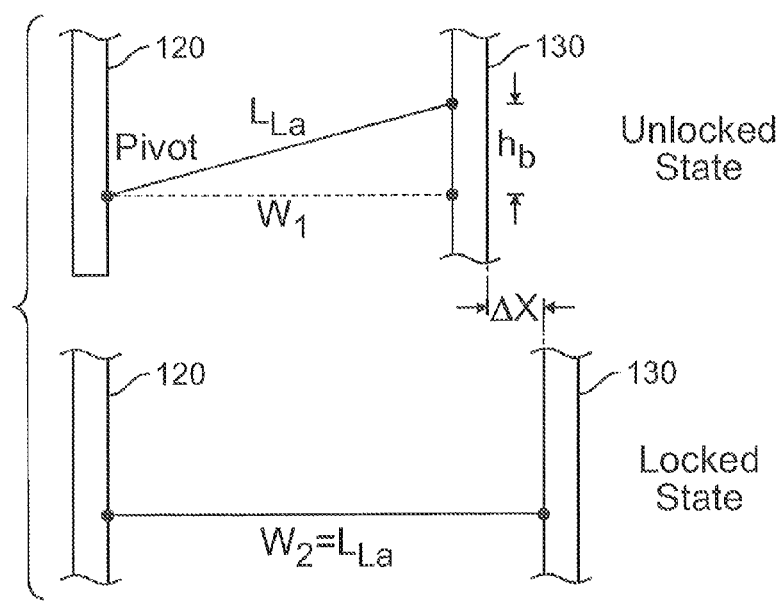

Referring to the FIGS. 16A and 16 13, the adjustable-length locking arm 200 once extended can serve as a constant radius for a circle as the length of the adjustable-length locking arm 200 is fixed for pivotal motion at one end. In this way, the end 230 of the arm is the center of the circle and the distal end 242 of the arm 200 will travel on a circular path. The amount of horizontal extension of the gate 100, when the gate is moved from the unlocked state to the locked state, can be calculated for any particular length of the adjustable-length locking arm 200 using established trigonometric principles as the height of travel within the guide bracket 300 is known. FIG. 1613 schematically depicts the supplemental horizontal extension of the gate 100 between its unlocked and locked states. With reference FIG. 16B, the upper portion schematically depicts the gate 100 in an unlocked state while the lower portion schematically depicts the gate 100 in a locked state. In the unlocked state, a geometric right triangle can be defined where one leg is the width of the gate in the unlocked state ($W_l$), the other leg is the height of the bracket ($h_b$), and the hypotenuse is the particular length of the adjustable-length locking arm 200 ($L_{la}$), when moved to a particular extended position. According to geometric principals, the length of the adjustable-length locking arm 200 ($L_{la}$) squared is equal to the sum of the width of the gate in the unlocked state ($W_l$) squared plus height of the bracket ($h_b$) squared. That is: $L_{la}^2 = W_l^2 + h_b^2$. When the gate is moved to its locked state, the width of the gate ($W_l$) is equal to the length of the adjustable-length locking arm 200 ($L_{la}$). Accordingly, the supplemental horizontal displacement of the gate when moving from the unlocked state to the locked state is equal to $L_{la} - W_l$. Combining and reducing the above equations, the supplemental horizontal displacement ($\Delta$) is:

$$\Delta = L_{la} - (L_{la}^2 - h_b^2)^{1/2}$$

In one construction of a gate embodying the features disclosed herein, the height of the guide bracket travel distance may be 3 to 8 inches. With that construction, the horizontal displacement can be calculated for any adjustable-length locking arm 200. In one example, if deployed so that the locking arm 200 is 36 inches, the horizontal linear displacement from the first unlocked state by rotating the locking arm 200 to the final horizontal position and placing the gate 100 in the locked state, would be approximately 0.05 to 0.90 inches. This horizontal displacement distance would be equal to any small spacing between the compressible members 140 and their adjacent wall surfaces 602, and the total amount compressible members 140 would collectively compress between opposing lateral ends 120 and 130.

As discussed, during the rotational movement of the adjustable-length locking arm 200, the distal end 242 of the adjustable-length locking arm 200 travels on a circular path. As the end 242 travels on the circular path, it also simultaneously travels both horizontally and vertically in linear directions. Again referring to the FIG. 16A, the adjustable-length locking arm 200 once extended can serve as a constant radius for a circle. The vertical displacement component can be advantageously used in the gate 100 in which the distal end 242 travels vertically along the guide bracket 300. The horizontal displacement component of the rotational movement can be advantageously employed to provide the press-fit engagement to the vertical surface. A rotational angle can be defined between the locking arm radius and the horizontal position. Using the another trigonometric relationship between the locking arm radius and the rotational angle, the horizontal displacement component (Δ) can be defined or governed by a mathematical formula of the arm length (R) minus the product of the arm length (R) times the cosine of the rotational angle. The horizontal displacement component equals R−(R*cosine (rotational angle)).

Figure 17:
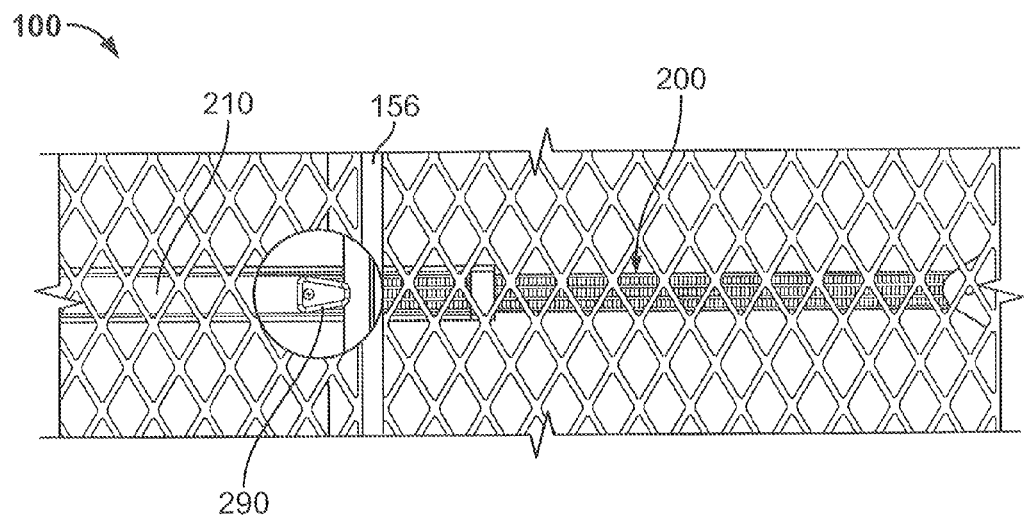
FIG. 17 is an enlarged view of the gate of FIG. 1 illustrating a rear clip assembly.

Referring now to FIG. 17, the adjustable-length locking arm 200 includes a rear clip member 290 mounted to the rear of the second arm member 210 of the arm 200. The clip 290 is slidably attached to the vertical rail 156 of the second panel 107. This rear clip 290 reinforces the adjustable-length locking arm 200 and prevents separation of the second arm member 210 from the gate frame to improve the strength to withstand impact forces against gate, such as impact forces caused by a child or adult inadvertently running into the gate panels. The rear clip member 290 can be constructed of an appropriate material for the intended use. For example, the clip 290 can be of a molded plastic construction, for example of ABS or nylon.

Figure 18A:
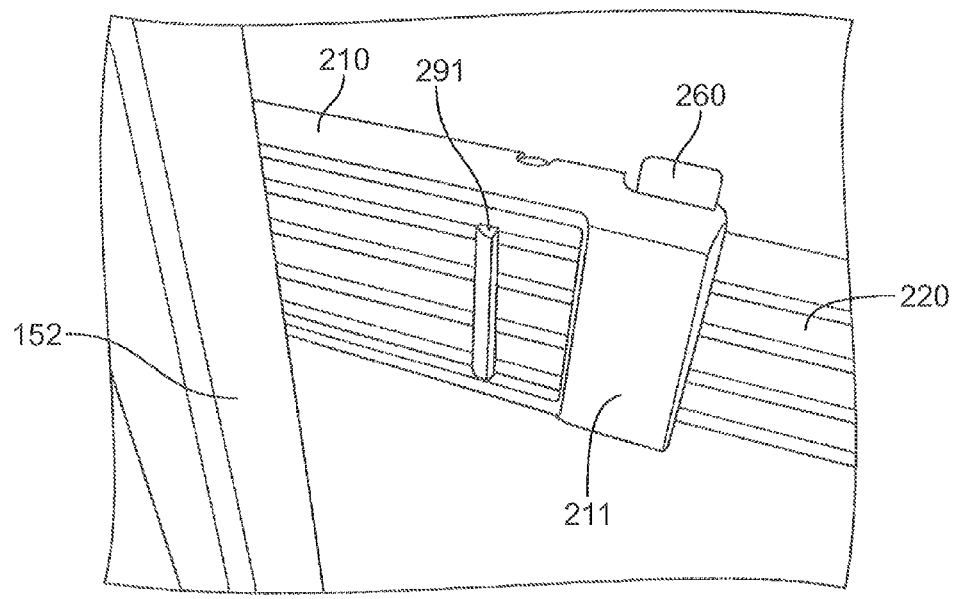
FIG. 18A is an enlarged rear perspective view of the gate of FIG. 1 illustrating a rear stop prior to abutting engagement.
Figure 18B:
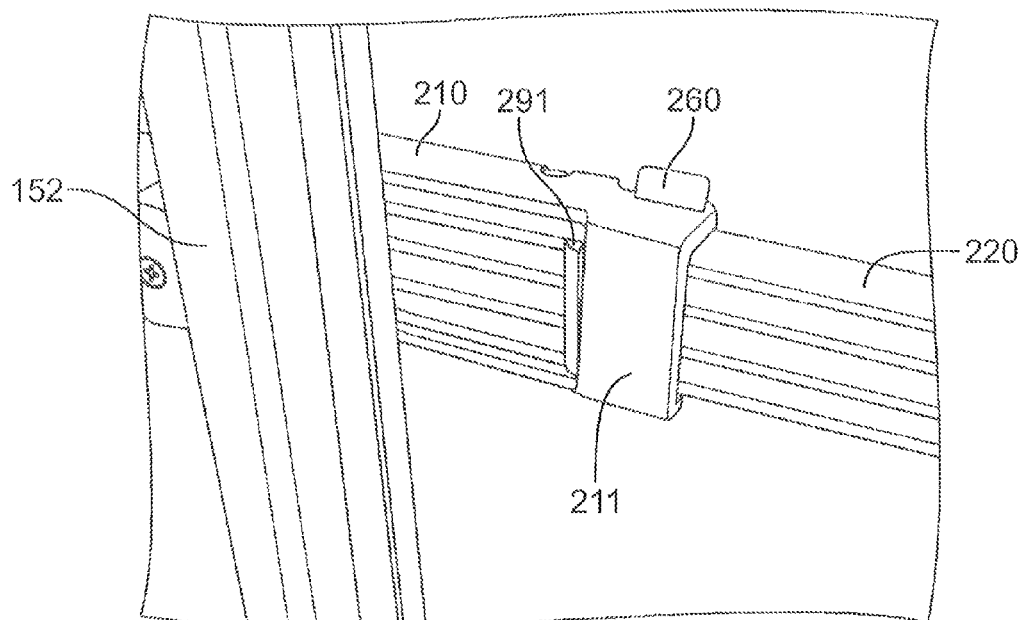
FIG. 18B is an enlarged rear perspective view of the gate of FIG. 1 illustrating a rear stop engagement.

Referring to FIGS. 18A and 18B, the adjustable-length locking arm 200 further includes a rear stop member 291 mounted to the rear of the first arm member 220 of the adjustable-length locking arm 200. Rear stop member 291 may be a prism shaped element molded or bonded to the rear of the first arm member 220. Rear stop member 291 controls the maximum extended width of the gate 100 to prevent separation of the gate panels 105, 107. In operation, when the gate 100 is expanded, a tubular element 211 of the second arm member 210 travels along the rear of the first arm member 220 as shown in FIG. 18A. The path of travel is stopped when the tubular element 211 abuts the rear stop member 291 as shown in FIG. 18B. This construction helps prevent pinching of small objects, such as the finger of a child.

The rear stop member 291 can be placed at any position along the rear surface of the first arm member 220 as desired. In one construction of the gate 100, shown in FIG. 19, the rear stop member is provided so that vertical rail 152 of panel 105 and vertical rail 156 of gate panel 107 are vertically aligned at the maximum gate width. In such a construction, the two panels 105, 107 have an overlap configuration. This overlap configuration at the maximum width advantageously enables the gate to withstand lateral impacts and maintain structural integrity. In an implementation of a gate construction, the overlap distance can be six to eight inches.

Gates embodying the features disclosed herein can be provided in a myriad of dimensional heights and widths for the intended use. In different constructions, the gate 100 can be provided in an appropriate height as desired by the user. For example, in many implementations, the gate height could range from 20 inches to 48 inches or more. Further, in many implementations, the expanded width of the gate 100 can range between 22 inches to 57 inches and can be provided in ¼ inch increments or other incremental values as desired. In other implementations, the supplemental horizontal displacement (Δ) during an unlocking to locking operation can range from 0.20 inches to 0.90 inches from the smallest width to the maximum width of the gate depending on the guide bracket height. In one construction, a gate may be provided for standard width doors. In one implementation, the locking arm 200 may be a fixed non-adjustable length construction. Nevertheless, the principles taught herein can be employed in a wide variety of configurations.

The use of the terms first or second when designating features is non-limited in scope in that the terms are used for ease of explanation. While the present invention has been described with reference to exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

What is claimed is:

1. A method of installing an expandable barrier, comprising:
   linearly sliding a first panel of the expandable barrier relative to a second panel along a horizontal axis, wherein the expandable barrier comprises a first lateral end and a second lateral end, the lateral ends being on opposing sides of the expandable barrier relative to the horizontal axis;
   rotating a locking member having a first end pivotally coupled to the first panel at a first location disposed on the first lateral end, to push the first panel away from the second panel; and
   sliding a second end of the locking member in a linear direction by pushing down on the locking member when moving from an unlocked state to a locked state.

2. The method of installing the expandable barrier as recited in claim 1, further comprising:
   sliding the second end of the locking member in the linear direction along a track.

3. The method of installing the expandable barrier as recited in claim 2, wherein the sliding the second end of the locking member is in a substantially vertical direction.

4. The method of installing the expandable barrier as recited in claim 2, further comprising:
   pushing downward on the locking member to overcome a resistance of at least one detent provided on the track.

5. The method of installing the expandable barrier as recited in claim 1, further comprising:
   sliding a first arm of the locking member along a second arm telescopically coupled to the first arm.

6. The method of installing the expandable barrier as recited in claim 5, further comprising:
   locking the relative movement of the first arm and the second arm.

7. The method of installing the expandable barrier as recited in claim 6, wherein the second arm includes a biased stop member configured to engage the first arm at a plurality of incrementally fixed positions along the length of the first arm.

8. A method of installing an expandable barrier, comprising:
   linearly sliding a first panel of the expandable barrier relative to a second panel along a horizontal axis, wherein the expandable barrier comprises a first lateral end and a second lateral end, the lateral ends being on opposing sides of the expandable barrier relative to the horizontal axis;
   providing a locking member having a first end pivotally coupled to the first panel;

sliding a second end of the locking member within a guide provided on the second panel; and locking the expandable barrier by rotating the locking member downwardly.

9. The method of installing the expandable barrier as recited in claim 8, further comprising:

compressing at least one first compressible member provided on the first lateral end and at least one second compressible member provided on the second lateral end.

10. The method of installing the expandable barrier as recited in claim 8, further comprising:

maintaining the locking member in an unlocked position when sliding the first panel relative to the second panel by providing at least one detent engagable with the second end of the locking member.

11. The method of installing the expandable barrier as recited in claim 10, further comprising:

pushing downward on the locking member to overcome a resistance of the at least one detent provided on the guide.

12. The method of installing the expandable barrier as recited in claim 8, further comprising:

moving the expandable barrier between a locked and unlocked state by adjusting a horizontal distance between opposing ends of the first and second panels, wherein the horizontal distance is a function of a length of the guide and a length of the locking member.

13. The method of installing the expandable barrier as recited in claim 12, further comprising:

moving the second end of the locking member in a substantially vertical and linear direction relative to the horizontal distance when moving between the locked and unlocked state.

14. The method of installing the expandable barrier as recited in claim 8, further comprising:

sliding a first arm of the locking member along a second arm telescopically coupled to the first arm.

15. The method of installing the expandable barrier as recited in claim 14, further comprising:

locking the relative movement of the first arm and the second arm.

16. The method of installing the expandable barrier as recited in claim 15, wherein the second arm includes a biased stop member configured to engage the first arm at a plurality of incrementally fixed positions along the length of the first arm.

17. The method of installing the expandable barrier as recited in claim 8, further comprising:

viewing a visual indicator to provide user feedback of at least one of the locked or unlocked states.

18. A method of installing an expandable barrier, comprising:

linearly sliding a first panel of the expandable barrier relative to a second panel along a horizontal axis, wherein the expandable barrier comprises a first lateral end and a second lateral end, the lateral ends being on opposing sides of the expandable barrier relative to the horizontal axis;

providing a locking member having a first end and a second end, wherein the first end is pivotally coupled to the first panel;

sliding the second end of the locking member within a guide provided on the second panel when moving between a locked and unlocked state;

rotating the locking member downwardly to lock the expandable barrier; and compressing at least one first compressible member provided on the first lateral end and at least one second compressible member provided on the second lateral end.

19. The method of installing the expandable barrier as recited in claim 18, wherein sliding the second end of the locking member within the guide is in a substantially vertical direction.

20. The method of installing the expandable barrier as recited in claim 18, wherein the locking member rotates downwardly towards a substantially horizontal position.

* * * * *